July 26, 1949.  D. ROEDER ET AL  2,477,090
WHEEL SUSPENSION
Filed Dec. 9, 1944  3 Sheets-Sheet 1

Dale Roeder
W. J. McClenahen
INVENTORS

BY Edwin C. McRae
R. G. Harris
A. Harney

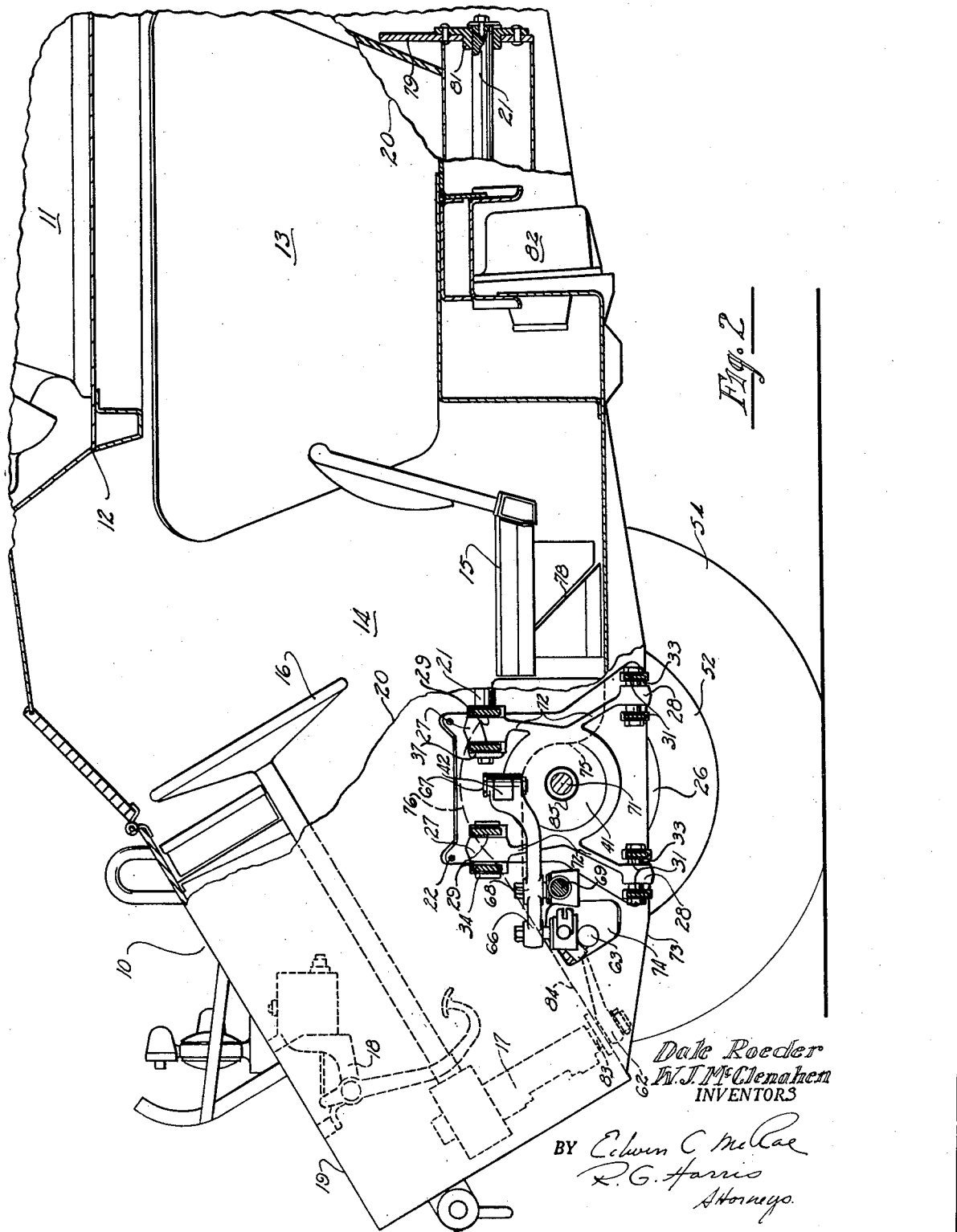

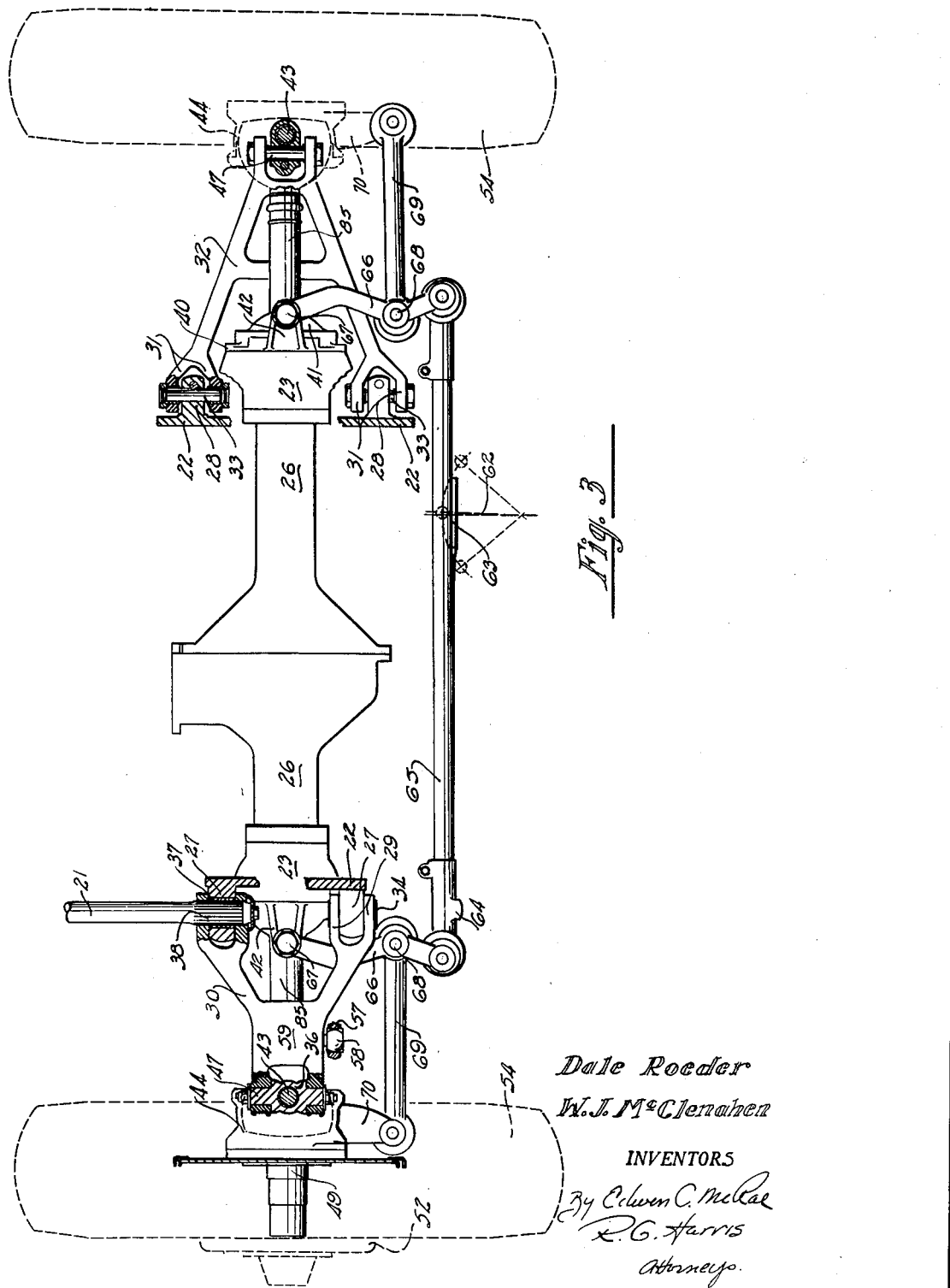

Patented July 26, 1949

2,477,090

UNITED STATES PATENT OFFICE 2,477,090

WHEEL SUSPENSION

Dale Roeder, Detroit, and Wright J. McClenahen, Dearborn, Mich., assignors to Ford Motor Company, Dearborn, Mich., a corporation of Delaware Application December 9, 1944, Serial No. 567,390

10 Claims. (Cl. 180—43)

This invention relates to motor vehicles and, more particularly, to a wheel suspension and an associated frame construction for certain of the driven wheels of said vehicle.

Numerous forms of structure for the front wheel suspension of motor vehicles have been devised. A well-known type extensively used is one in which the king pin bracket is supported by a pair of vertically spaced arms pivotally connected about horizontal axis to the frame and the bracket and both of said arms being generally of a V or "wishbone" type. This form of construction is in widespread use for passenger cars and usually employs coil springs for the resilient mounting. Of course, in the great majority of commercial applications, it is used only on the front wheels of the conventional rear wheel drive vehicle. When it has been applied to the driven wheels, flexible drive shafts have merely been added without particular attention to co-ordination with the suspension and the resultant construction has not generally been found satisfactory as a means for mounting the driven wheels of the vehicle. The advantage of the present invention is that it co-ordinates a suspension of proven value with a vehicle frame and the drive means in such a way as to increase the rigidity and strength of the entire construction, which is immediately reflected in increased life of the vehicle structure and tires without impairing in any manner the accessibility of the components both for assembly and repair.

While this device, in the present instance is shown as applied to a heavy military vehicle—specifically a type of armored car, it is equally applicable to the ordinary motor vehicles, either with or without the drive feature. Indeed, it is particularly suited to vehicles of the constructional type exemplified by the "Lincoln-Zephyr" in which there is, properly speaking, no absolute division between the frame and the body; but in which both of these elements form an entirely integrated construction. The vehicle in question has, in fact, no frame, as such, but rather a hull which serves the function of both frame and body. The same principles are readily translated into civilian vehicle designs.

The principal advantages are the combination of the suspension with the vehicle frame (or body, as the case may be) with—or without—the addition of the driving means. This combination leads to increased stability and strength of all the components and yet leaves them readily available both for the purposes of assembly and adjustment or repair during operation. A further advantage is the adaptability of the construction to vehicles of the "frameless" type and the superior result achieved in such vehicles with an attendant decrease in the unsprung weight, but with a noteworthy increase in structural rigidity.

With these and other objects in view, the invention consists in the arrangement, construction and combination of the various parts of the improved device, as described in the specification, claimed in the claims and illustrated in the accompanying drawings, in which:

Figure 2 is a longitudinal sectional elevation of the front part of the armored car employing the construction, with portions of the vehicle hull being broken away in different areas to show the method of attachment of the suspension to the hull and the suspension itself as well as certain details of the hull construction.

Figure 3 is a plan view of the suspension showing the differential, steering and suspension combination, the remaining parts of the hull being omitted and the upper link of the suspension being shown on the left-hand side of the drawing and the lower link thereof being shown on the right-hand side of the drawing.

Figure 1:
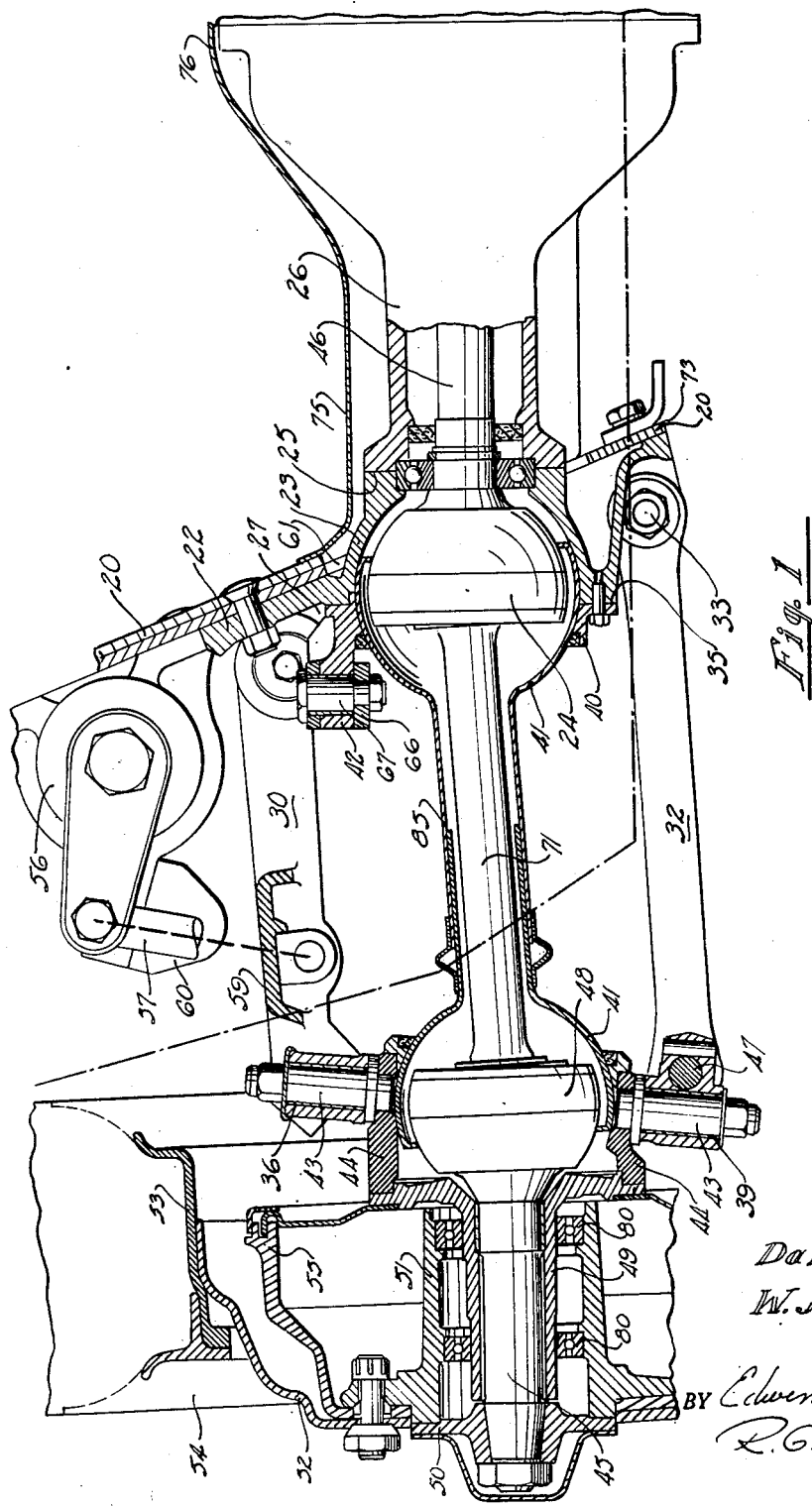
Figure 1 is a vertical sectional view taken transversely of the vehicle on the approximate center line of one of the vehicle wheel drive means and showing the complete suspension as applied to one wheel.

Referring first to Figure 2, 10 indicates the front portion of an armored vehicle having a gun turret 11 rotatably supported on the hull 12 of the above enclosed turret area 13; and a driver's section 14 in the forward part of the vehicle in which is located the seat 15, the steering wheel 16 and gear 17, and the clutch and brake controls 18 mounted on the upper wall 19 of the hull 12. In the drawing as shown, the side wall 20 of the hull 12 is broken away rearwardly of the front wheel suspension in order to show the interior of the hull and the successive floor arrangement. While the location of the transfer case 82 is indicated, the drive shafts leading to the respective differentials, both front and rear are not shown, since they do not form a part of this invention. At the extreme right-hand portion of the drawing, the view is again referred to exterior of the side wall 20 of the hull to show the anchorage of the torsion bar 21, which is used to provide the necessary resiliency for the suspension and which is mounted outside of the hull proper extending rearwardly from the front wheel suspension.

Turning now to Figure 1, the side wall 20 of the hull is shown as supporting a heavy mounting plate 22, which is bolted to the exterior thereof and includes the hemispherical portion 23, projecting inwardly of the side wall through the aperture 61 therein and serving as part of a housing for the universal joint 24. To the inner face 25 of this portion is secured the differential housing 26 which, of course, extends across the vehicle and connects similarly with a like plate on the opposite side. It will thus be seen that the opposite hull members, rigidly joined together through the medium of the plates 22 on each side and the differential housing 26, form a rigid transverse structure. In addition, the inner face 25 is substantially vertical and so arranged with respect to the lower edge of the aperture 61 that it may be easily assembled and disassembled.

The plate 22 also includes a pair of longitudinally spaced upper lugs 27 and a pair of longitudinally spaced lower lugs 28 to which are pivotally attached the forked ends 29 of the upper wishbone 30 and the forked ends 31 of the lower wishbone 32, respectively. The lower connections are by threaded bushings 33, of the type commonly used to afford the requisite caster and camber adjustment, while the upper forward attachment 34 is a simple sleeve bushing and the upper rearward attachment 37 is splined at 38 to the forward end of the torsion bar 21, serving to transmit the rotation of the arm 30 about the pivot through 34 and 37 directly to the torsion bar. The particular construction of these bushings is not shown in detail, since they are largely conventional.

A retainer plate 40 is bolted to the outer surface 35 of the plate 22 and completes the support for the universal joint 24. The shell housing 41, therefore, is rotatably retained in position between the plates 22 and 40. Also attached to the retainer plate 40 is a bracket 42 serving as a pivot anchorage for the steering linkage to be described later. The upper and lower wishbones 30 and 32 are pivotally attached about horizontal axes through trunnions 47 at their outer ends to the upper and lower journals 36 and 39, which in turn rotatably support the upper and lower ends of the king pin 43. The outer universal joint housing 44 is welded to the king pin 43 and has as an extension 49 in which the spindle 45 is journaled. The drive is effected through the main drive shaft 46 connecting with the differential and with one member of the inner universal joint 24. The intermediate shaft 71 then interconnects the inner and outer universal joints 24 and 48. The spindle 45 is driven by the outer universal joint 48 and connects to the hub driving flange 50 which, in turn, is secured to the hub 51 supported on the bearings 80 on the extension 49. A disc wheel 52 with a rim 53 and tire 54 and a brake drum 55 are associated with the hub 51 in the usual manner. In fundamental construction, this drive is quite similar to a number which have been used for independently suspended and steerable wheels. The protective closure of the driving train is completed by the usual telescopic sheath 85 formed by extensions of the shell housings 41.

Also attached to the side wall 20 and substantially aligned with the mounting plate 22 is a shock absorber 56 of the rotatable vane type connected through a link 57 to a ball joint 58 on the forward surface of the upper wishbone 30 (Figures 1 and 3). As best shown on those figures, the upper wishbone 30 is formed with a central platform 59 of substantial extent which co-operates with the rubber bumper 60 to limit the extreme upward position of the suspension linkage.

Directional control of the wheels is effected through the conventional steering wheel and gears 16 and 17, referred to above, which are entirely mounted within the hull of the vehicle, and drive the steering arm 62 through a shaft 83 passing through a waterproofed aperture in the floor 84 of the vehicle. This is pivotally connected with the link 63 which, in turn, is pivotally attached at 64 to the right end of the transverse tie link 65, as shown in Figure 3. The link 65 pivoted at each end to the forward end of a lever arm 66 whose rearward end is pivotally supported on the pin 67 in the bracket 42 on the retainer 40. A connecting link 69 is universally attached at its inner end to an intermediate point 68 on the arm 66 and at its outer end to the end of the steering spindle arm 70.

From the foregoing, it will be clear that the steering arm 62, the link 63, the tie link 65 and the lever arms 66 are all movable with the chassis rather than with the wheel support and, in fact, constitute a part of the sprung weight. The connecting links 69, alone, may have a vertical component of motion relative to the chassis.

Referring again to Figure 2, the outline of the mounting plate 22 is clearly shown and it will be noted that it is provided with integrally formed reinforcing webs 72 leading to the upper and lower lugs 27 and 28. The side wall 20, which supports it, extends downwardly a considerable distance, its bottom edge being noted at 73 and an aperture 74 is formed in it to accommodate the steering linkage described above. Inasmuch as the linkage where it passes through the wall 20, is restrained against vertical motion relative to the wall, the aperture need only be large enough to permit its ready insertion and removal. The figure also shows certain features of the internal dispositions of the vehicle. The floor of the vehicle on either side of the differential housing is indicated by the dotted line 75 and over the differential housing by the line 76, both of which merge in the forward portion of the vehicle to form the floor 84. The seat 15 is adjustable vertically by means of the inclined plane construction 78, so that the operator can be brought into proper position with relationship to the steering wheel 16 and the controls in the forward end of the vehicle. The torsion bar 21, referred to above, which provides the springing action for the vehicle, extends rearwardly a considerable distance, its midsection not being shown since the side wall 20 is broken away for a considerable extent to show the internal arrangements and the torsion bar is mounted outwardly of this side wall and between it and the light metal fender which surrounds the entire vehicle outwardly of the wheels but which is not shown in these drawings. The anchorages for the bars are mounted a considerable distance toward the rear and includes a structural cross member 79 rigidly secured to the hull, to which is riveted a splined collar 81 receiving the splined rear end of the bar 21. The hull supports for the transfer case 82 are also indicated, but details of this or of the drive shafts to the front and rear wheels are not shown as they do not constitute part of this invention.

Figure 1, perhaps, best indicates why the particular construction has been found so advantageous. In effect, this use of the differential housing as the main structural cross member reinforcing, by means of the mounting plates disposed on the opposite outer sides of the body, forms an internal strut for the hull as well as a direct support for the independent suspension. The particular advantage is that the entire differential section and the mounting plates are rigidly attached to each other and to the hull and there really is no frame at all provided for the vehicle. By reason of the construction, it is very easy to remove the suspension and replace it, as all that is required is the withdrawal of the pivot pins at the ends of the wishbone and the removal of the retainer 40. The hull then supports the differential housing through the mounting plates which remain attached to both elements. Should it be necessary to remove the differential—which should occur rather infrequently—all that need be done is to remove the mounting plate, withdrawing it outwardly, and the differential housing may then be dropped without any difficulty. Thus, as may be seen from this example, it is equally easy to assemble or disassemble the device which is a factor of great importance in vehicles of this size and weight. In military operation, it may reasonably be expected that the running gear being most exposed is more easily damaged in action. Thus, the steering linkage, suspension components and the like—even though they are made as sturdy as possible—must be readily removable for service and maintenance. Heretofore, in the usual construction, in order to obtain the necessary strength, a solid axle was requisite and injury to one wheel required the removal of the entire front running gear. In the present instance, this has been done away with and it is necessary only to change the particular wheel damaged. Repair is further facilitated by reason of the steering linkage having only a short vertically movable connecting link which is readily removable if need be; but as the major portion of the linkage is well protected within the side walls, the remainder is rarely damaged.

The method by which this construction can be applied to a typical passenger vehicle will be apparent at once. It is particularly fitted to the type of vehicle which employs an integrated structure rather than the mere superposition of the body on the chassis—notably the Lincoln-Zephyr. Here, the side walls referred to and described in the present construction become the body panels. As usual, in passenger vehicles, the body panel is located inwardly of the wheels; and a fender panel in one form or another, located outwardly of the wheel, and spaced from the body panel, provides the wheel housing. The mounting plates would then be attached to the body panels precisely as shown here and associated with a differential housing mounted inwardly of the body panels in the case of application to a driven wheel. This, of course, would strengthen the structure precisely at the point where it is most needed to resist the reaction forces imposed by the driven element. Of even greater importance is the firm anchorage provided for the wishbones of the suspension for it has always been a difficult problem on a conventional frame construction to obtain the requisite rigidity attachment. Here the reaction forces incident to the driving of the wheels and those required to resist the springing action of the suspension, are transferred directly to an integrated structural unit represented by the transverse strut and the mounting plates rather than to the longitudinal frame member as practiced in most conventional cars or to an unintegrated body structure as has been done in those foreign cars of the frameless type which employed independent suspension. Again, the steering linkage shown has particular value due to the low unsprung weight and—as it requires but four ball joints—its economy. All the other advantages relative to assembly and disassembly for repair and maintenance are equally available when the structure is applied in lighter form to a passenger vehicle. While it is shown here with torsion bar springing, it may employ coil springs between the respective arms or between either one of the arms and the body as is the conventional practice in this art.

Some changes may be made in the arrangement, construction and combination of the various parts of the improved device, without departing from the spirit of the invention, and it is the intention to cover by the claims such changes as may reasonably be included within the scope thereof.

We claim:

1. In a motor vehicle employing individual wheel springing, a body, a rigid mounting plate of substantial area directly secured to the exterior of said body on each side thereof in a substantially vertical plane and in transverse alignment thereon, a wheel supporting means carried by a pair of spaced upper pivotal attaching means and a pair of spaced lower pivotal attaching means on each said mounting plate, upper and lower connecting arms secured for pivotal movement about respective horizontal axes at their inner ends to said mounting plate and at their outer ends to said wheel supporting means, a horizontal strut member traversing said body and abutting and secured to the inner surfaces of said mounting plates between the upper and lower pivotal attaching means, and spring means interposed between said body and one of said connecting arms, said strut being supported solely by its engagement with said mounting plates.

2. In a motor vehicle employing individual dirigible wheel springing, a body, a rigid mounting plate of substantial area secured to the exterior of said body on each side thereof and in transverse alignment thereon, a wheel supporting means carried by a pair of spaced upper pivotal attaching means and a pair of spaced lower pivotal attaching means on the exterior of each said mounting plate, upper and lower connecting arms secured for pivotal movement about respective horizontal axes at their inner ends to said last-named attaching means and at their outer ends to said wheel supporting means, a horizontal strut member traversing said body and abutting and secured to the inner surfaces of said mounting plates between the upper and lower pivotal attaching means, spring means interposed between said body and one of said arms on each side of said body, and a steering linkage to operate said dirigible wheels comprising a transverse tie link and a drag link and a pair of lever links solely supported on said mounting plates.

3. In a motor vehicle employing individual dirigible wheel springing, a body, a rigid mounting plate of substantial area secured to the exterior of said body on each side thereof and in transverse alignment thereon, a wheel supporting means carried by a pair of spaced upper pivotal attaching means and a pair of spaced lower pivotal attaching means on the exterior of each said mounting plate, upper and lower connecting arms secured for pivotal movement about respective horizontal axes at their inner ends to said last-named attaching means and at their outer ends to said wheel supporting means, a horizontal strut member traversing said body and abutting and secured to the inner surfaces of said mounting plates between the upper and lower pivotal attaching means, spring means interposed between said body and one of said arms on each side of said body, and a steering linkage for said dirigible wheels comprising a lever arm supported at one end for movement in the horizontal plane on each of said mounting plates, a tie link extending between the free ends of said arms and supported thereby, a drag link associated with said tie link adjacent one end thereof, and connecting links leading from each said lever arm to an arm on the adjacent wheel supporting means, each said connecting links being secured for universal movement to said lever arm and said arm on said wheel supporting means.

4. In a motor vehicle employing individual wheel springing, a body, a rigid mounting plate of substantial area directly secured to the exterior of said body on each side thereof and in transverse alignment thereon, a wheel supporting means carried by a pair of spaced upper pivotal attaching means and a pair of spaced lower pivotal attaching means on the exterior of each said mounting plate, upper and lower connecting arms secured for pivotal movement about respective horizontal axes at their inner ends to said last-named attaching means and at their outer ends to said wheel supporting means, a horizontal strut member traversing said body and abutting and secured to the inner surfaces of said mounting plates between the upper and lower pivotal attaching means, a vertical pivot on each said mounting plate, a lever arm mounted on said pivot for movement in a substantially horizontal plane, a transverse link securing together the free ends of said arms, a wheel mounted on said wheel supporting means, a spindle arm associated with said wheel, and a connecting link extending between and having a universal movement connection with said spindle arm and said lever arm secured to said mounting plate.

5. In a motor vehicle employing individual wheel springing for the driven wheel thereof, a body, a rigid mounting plate of substantial area secured to the exterior of said body on each side thereof and in transverse alignment thereon, a strut member traversing said body and abutting, and secured to the inner surfaces of said mounting plates at its ends, said strut member comprising a differential housing, a pair of spaced upper pivotal attaching means and a pair of spaced lower pivotal attaching means on each said mounting plate, a wheel supporting means carried by upper and lower connecting arms secured for pivotal movement about respective horizontal axes at their inner ends to said last-named attaching means and at their outer ends to said wheel supporting means, a universal joint received in said mounting plate, a second universal joint received in said wheel supporting means, a shaft extending from said differential to said first-named universal joint, a second shaft extending from said first-named universal joint to said second universal joint drive, a wheel mounted on said wheel supporting means, and a driving connection between said second universal joint and said wheel.

6. In a motor vehicle employing individual wheel springing for the driven wheel, a body, a rigid mounting plate of substantial area directly secured to the exterior of said body on each side thereof and in transverse alignment thereon, a strut member traversing said body and abutting, and secured to the inner surfaces of said mounting plates at its ends, said strut member comprising a differential housing, a differential in said housing, a universal joint housing partially formed on the exterior of said mounting plate, a wheel supporting means carried by vertically spaced arms mounted for pivotal movement about horizontal axes on said mounting plate and said wheel supporting means, a second universal joint housing partially formed in said wheel supporting means, a universal joint in each of said housings, a shaft from said differential housing to said first-named universal joint and a shaft between said universal joints to transmit rotation to said wheel mounted on said wheel supporting means, said mounting plates serving as the sole direct support of said differential and said wheel suspension.

7. In a motor vehicle employing individual wheel springing for the dirigible driven wheels, a body, a rigid mounting plate of substantial area directly secured to the exterior of said body on each side thereof in transverse alignment thereon, a strut member traversing said body and abutting, and secured to said mounting plates at its ends, said strut member comprising a differential housing, a differential in said housing, the outer surface of said mounting plates being formed to receive a universal joint, a pair of spaced upper pivotal attaching means and a pair of spaced lower pivotal attaching means on said mounting plate, a wheel supporting means carried by upper and lower connecting arms secured for pivotal movement about respective horizontal axes at their inner ends to said last-named attaching means and at their outer ends to said wheel supporting means, a universal joint received in the outer surface of each of said mounting plates, a second universal joint received in the inner surface of each said wheel supporting means, a shaft from said differential to said first universal joint, a shaft extending between said universal joints, whereby rotation is imparted to a wheel mounted on said wheel receiving means, a retainer mounted on the outer surface of each said mounting plate to secure said first-named universal joint in position therein, and means on each said retainer serving as the sole support of a steering linkage controlling said dirigible wheels.

8. In a motor vehicle employing individual wheel springing, a body, a rigid mounting plate of substantial area secured to the exterior of said body on each side thereof and in transverse alignment thereon, a strut member traversing beneath said body and abutting the opposed inner faces of said mounting plates at its ends, a pair of spaced upper pivotal attaching means and a pair of spaced lower pivotal attaching means on each said mounting plate, a wheel supporting means carried by upper and lower connecting arms secured for pivotal movement about respective horizontal axes at their inner ends to said attaching means and at their outer ends to respective journals in substantially, vertical alignment, a king bolt rotatably received in said journals and immovably secured to said wheel supporting means, said strut member comprising a differential housing, said mounting plate and said strut abutting on a vertical plane and being releasably secured to each other thereat, a semispherical recess formed in the outer surface of said mounting plate adapted to receive a universal joint, a universal joint located in said recess, a second universal joint supported in said wheel supporting means, a differential in said differential housing, a shaft leading from said differential to said first universal joint, a shaft between said first universal joint and said second universal joint and a driving connection from the last-named member to impart rotation to a wheel mounted on said wheel supporting means, a bracket means secured to each said mounting plate and serving as the sole support for a steering linkage traversing said body and operatively connected to said wheel supporting means for dirigible operation of said wheels.

9. In a motor vehicle employing individual springing of dirigible driven wheels, a body, a rigid mounting plate of substantial area secured to the outer surface of said body on each side thereof and a transverse alignment thereon, a strut member traversing said body and abutting said mounting plates at its ends, a pair of spaced upper pivotal attaching means and a pair of spaced lower pivotal attaching means on each said mounting plate, a wheel supporting means carried by upper and lower connecting arms secured for pivotal movement about respective horizontal axes at their inner ends to said attaching means and at their outer ends to said wheel supporting means, a torsion bar spring means interposed between said body on each side thereof and one of said arms, a recess formed in the outer surface of each said mounting plate, a universal joint mounted in said recess, a second universal joint mounted in said wheel supporting means, a driving shaft in said transverse strut connected to said first universal joint, shafts extending from said first universal joint to said second universal joint to impart torque to a wheel mounted on said wheel supporting means, a bracket attached to each said mounting plate, a lever arm pivoted on a vertical axis on each said bracket, a tie link extending between the free ends of said lever arms, a drag link associated with said tie link adjacent one end thereof, connecting links leading from said each lever arm intermediate the point of attachment to said tie link and to said bracket to said wheel supporting means, there being a universal joint provided at each end of each said connecting link, and said linkage being supported solely from said mounting plates.

10. The structure of claim 9, which is further characterized in that said strut member is supported solely by its engagement with said mounting plates.

DALE ROEDER.
WRIGHT J. McCLENAHEN.

REFERENCES CITED

The following references are of record in the file of this patent:

UNITED STATES PATENTS

| Number | Name | Date |
|---|---|---|
| 2,052,064 | Whisenand | Aug. 25, 1936 |
| 2,071,577 | Renwick et al. | Feb. 23, 1937 |
| 2,114,452 | Miller | Apr. 19, 1938 |
| 2,128,660 | Moorhouse | Aug. 30, 1938 |
| 2,153,271 | Paton | Apr. 4, 1939 |
| 2,163,981 | Lawrence | June 27, 1939 |
| 2,173,667 | Slack | Sept. 19, 1939 |
| 2,206,342 | Wiebicke | July 2, 1940 |
| 2,206,970 | Megow | July 9, 1940 |
| 2,219,828 | Steinmann | Oct. 29, 1940 |
| 2,378,303 | Blaser | Mar. 31, 1942 |

OTHER REFERENCES

"Automobile Engineer," page 98, March 1944.